United States Patent

[11] 3,612,908

[72] Inventor Gary L. Heimbigner
Anaheim, Calif.
[21] Appl. No. 878,478
[22] Filed Nov. 20, 1969
[45] Patented Oct. 12, 1971
[73] Assignee North American Rockwell Corporation

[54] METAL OXIDE SEMICONDUCTOR (MOS) HYSTERESIS CIRCUITS
8 Claims, 9 Drawing Figs.

[52] U.S. Cl. .......... 307/279, 307/251, 307/304
[51] Int. Cl. .......... H03k 1/12
[50] Field of Search .......... 307/304, 205, 215, 218, 221 C, 246, 251, 279

[56] References Cited

UNITED STATES PATENTS

| | | | |
|---|---|---|---|
| 3,267,295 | 8/1966 | Zuk | 307/279 |
| 3,522,454 | 8/1970 | Gilmour | 307/251 |
| 3,292,008 | 12/1966 | Rapp | 307/251 |
| 3,382,455 | 5/1968 | Rapp | 307/215 |
| 3,509,379 | 4/1970 | Rapp | 307/279 |
| 3,526,783 | 9/1970 | Booher | 307/251 |
| 3,484,625 | 12/1969 | Booher | 307/215 |

OTHER REFERENCES

" Multiphase Clocking Achieves 100- Nsec MOS Memory" BY Lee Boysel & Joe Murphy, Fairchild Semiconductor in Electronic Design News, June 10, 1968, pages 50 to 55.

*Primary Examiner*—Donald D. Forrer
*Assistant Examiner*—R. E. Hart
*Attorneys*—L. Lee Humphries, H. Fredrick Hamann and Edward Dugas

ABSTRACT: The invention is directed to circuits which have positive feedback operation to shift the input trigger point of the circuit to a new value, depending upon what the last bona-fide input logic level was. The spread between the two trigger levels is set by the initial design with some adjustment of the spread being achieved by an external control input. The circuits are applicable to N or P channel MOS devices.

INVENTOR.
GARY L. HEIMBIGNER
BY Edward Dugas
ATTORNEY

INVENTOR.
GARY L. HEIMBIGNER

BY Edward Dugas
ATTORNEY

INVENTOR.
GARY L. HEIMBIGNER
BY Edward Dugas
ATTORNEY

INVENTOR.
GARY L. HEIMBIGNER
BY Edward Dugas
ATTORNEY

METAL OXIDE SEMICONDUCTOR (MOS) HYSTERESIS CIRCUITS

BACKGROUND OF THE INVENTION

Digital circuits have been plagued with the problem of noise causing the circuits to switch to a different state. Various methods have been used to decrease the noise sensitivity of these circuits but these methods involve the addition of an unwarranted number of circuit components or extreme modifications in the wave shapes used to trigger the circuits. Another noteworthy problem encountered in digital circuits is charge robbing when asynchronous signals are sampled.

SUMMARY OF THE INVENTION

The circuit embodiments of the present invention are directed to a detector means which switches between two output states when the signal applied to the detector means reaches predetermined thresholds. A first conductance member is connected in series with the detector to form a complete circuit and to fix a first threshold level for the detector means; a second conductance switching means is adapted to be connected to the output of the detector switches between two states in response to the output state of the detector, and positive feedback means connected between the output of the output means and the second conductance switching means to switch the threshold level of the detector in response to the output of the output means by connecting the second conductance means across the first conductance means.

BRIEF DESCRIPTION OF THE PREFERRED EMBODIMENTS OF THE INVENTION

Figure 1:
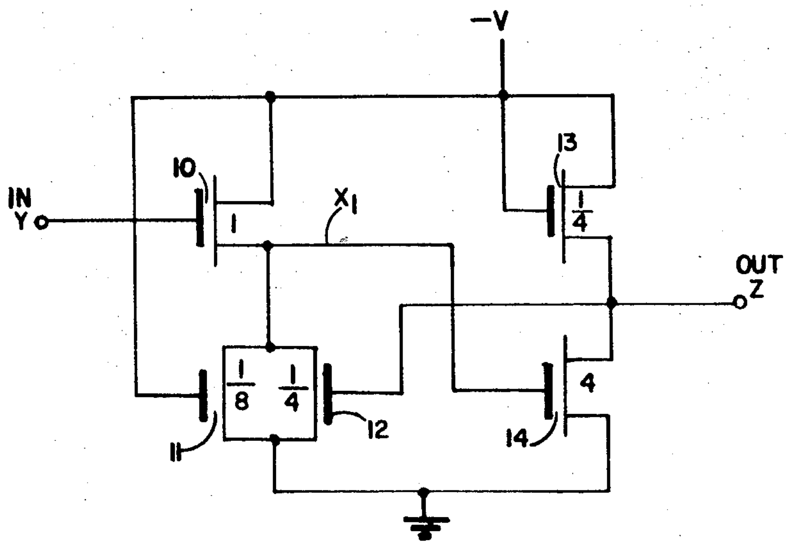
FIG. 1 is a circuit schematic diagram of a first embodiment of the invention.

Referring to FIG. 1 wherein field effect transistors of the P-type are 197 1 gate of transistor 10 is connected to an input terminal Y. The drain of transistor 10 is connected to a source of negative potential −V and the source of transistor 10 is connected to the drain of transistors 11 and 12 and to the gate of transistor 14. Transistor 10 operates as a level detector, turning on when the voltage on its gate reaches a predetermined negative value as compared to the voltage on the source. The gate of transistor 11 is connected to the potential source −V, along with the gate and drain of transistor 13. Transistor 11 operates as a first conductance which is serially combined with the conductance of transistor 10 to form a voltage divider network at terminal X. The source of transistor 13 and the drain of transistor 14 are connected to the gate of transistor 12 and to the output terminal Z. The sources of transistors 11, 12 and 14 are connected to ground. Transistor 12 forms a second switchable conductance member which is connected in parallel across the first conductance member when transistor 12 is on. This effectively reduces the resistance of the combination of the first and second conductances thereby changing the voltage divider ratio between transistor 10 and transistors 11 and 12.

Figure 2A:
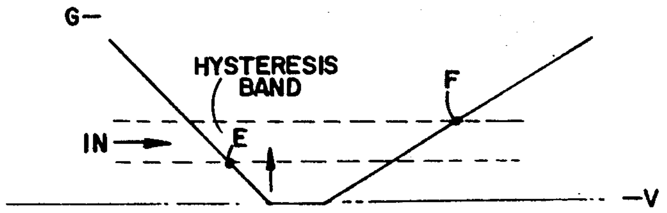
FIG. 2*a* and 2*b* illustrate waveforms useful in understanding the operation of the first embodiment of the invention.
Figure 2B:
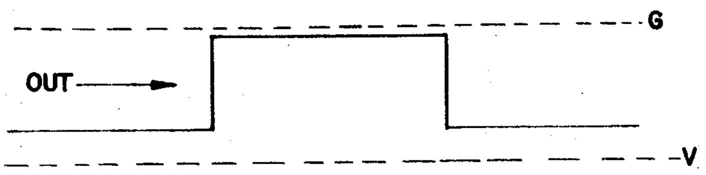

The signal applied to terminal Y is shown in an exaggerated view in FIG. 2*a* , with the slopes of the leading and trailing edges exaggerated in order to more clearly show the points at which the device triggers on and off. The output available at terminal Z is shown in FIG. 2*b* .

The circuit of FIG. 1 operates as follows: As the input signal on terminal Y goes negative and approaches and passes the trigger level E of transistor 10, transistor 10 is turned on. As transistor 10 turns on, the voltage on the gate of transistor 14, point X, goes more negative turning transistor 14 on and moving the potential at the output terminal Z towards ground. As the output terminal Z goes towards ground, the gate of transistor 12 also goes towards ground, tending to turn transistor 12 off. As transistor 12 is turning off, the division of voltage between transistors 11 and 10 causes point X to move more negative which tends to turn transistor 14 on harder, moving the output terminal Z closer to ground, turning transistor 12 completely off.

As the signal on the input terminal Y goes more positive, X goes more positive which tends to turn transistor 14 off. As transistor 14 starts to turn off, the output terminal Z goes more negative, towards the −V potential source, which makes transistor 12 turn on more which causes the point X to go more positive towards ground, which tends to turn transistor 14 off which, in turn, makes transistor 12 turn on harder. The potential rise and fall of point X changes the trigger level between that level which turns transistor 10 on and that level which turns transistor 10 off. The difference in the on and off level produces a hysteresis band which has the effect that once the transistor 10 is on it will remain on even in the face of noise as long as the amplitude of the noise level is within the hysteresis band of the circuit. 4

The conductance value of transistors 10 and 11 defines the trigger point when the input signal is going positive and, therefore, controls the trigger level at the trailing edge of an input waveform with transistors 11 and 12 ratioed against transistor 10 being the dominant control factor when the input is going negative. The ratios shown on the drawing, namely 1 for transistor 10, one-eighth for transistor 11, one-fourth for transistor 12 and 13 and 4 for transistor 14 are indices of the conductance ratio of the individual MOS devices with respect to each other. The larger the number, the larger the conductance. The unit 1 indicates a ratio of surface width equal to surface length. The fractional numbers have the numerator equal to the width and the denominator equal to the length.

Figure 3:
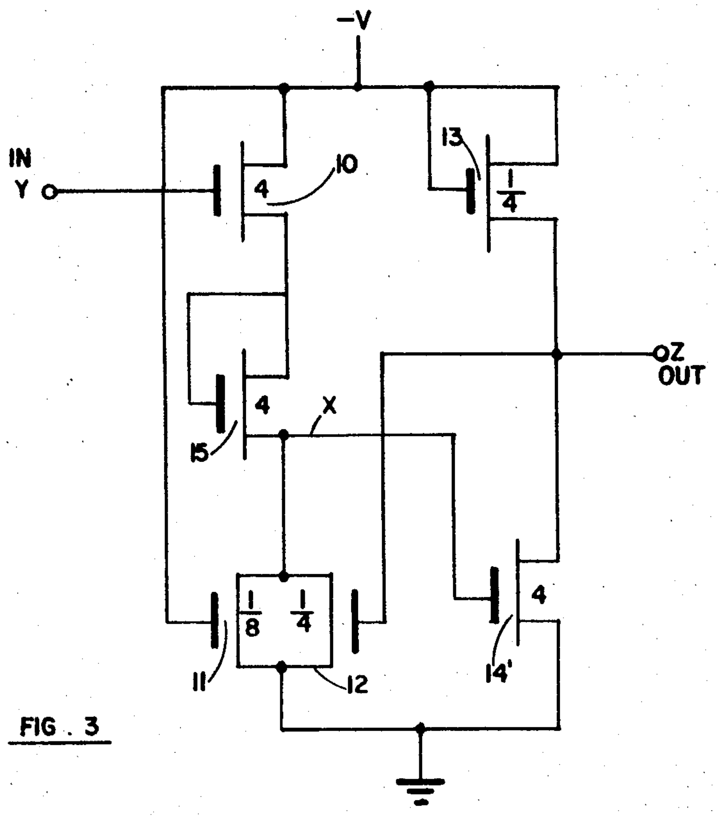
FIG. 3 is a circuit schematic diagram of a second embodiment of the invention.

Referring to FIG. 3, the circuit of FIG. 3 is identical to that shown in FIG. 1 with the addition of one more transistor 15 interposed between transistors 10 and 11 with the drain and gate of transistor 15 connected to the source of transistor 10 and the source of transistor 15 connected to the drain of transistors 11 and 12. The only other modification is that the gate of transistor 14 is now connected to the source of transistor 15 instead of the source of transistor 10. The insertion of an additional transistor between transistors 10 and 11 has the effect of lowering the trigger point by one is device drop. The gate electrode for transistor 14, being connected to the source of transistor 15 is now located two device drops, usually 12 volts above the −V potential source instead of one device drop (6 volts) as previously encountered in the circuit of FIG. 1. In operation, the circuit operates identically to that of FIG. 1 except for the different threshold level.

Figure 4:
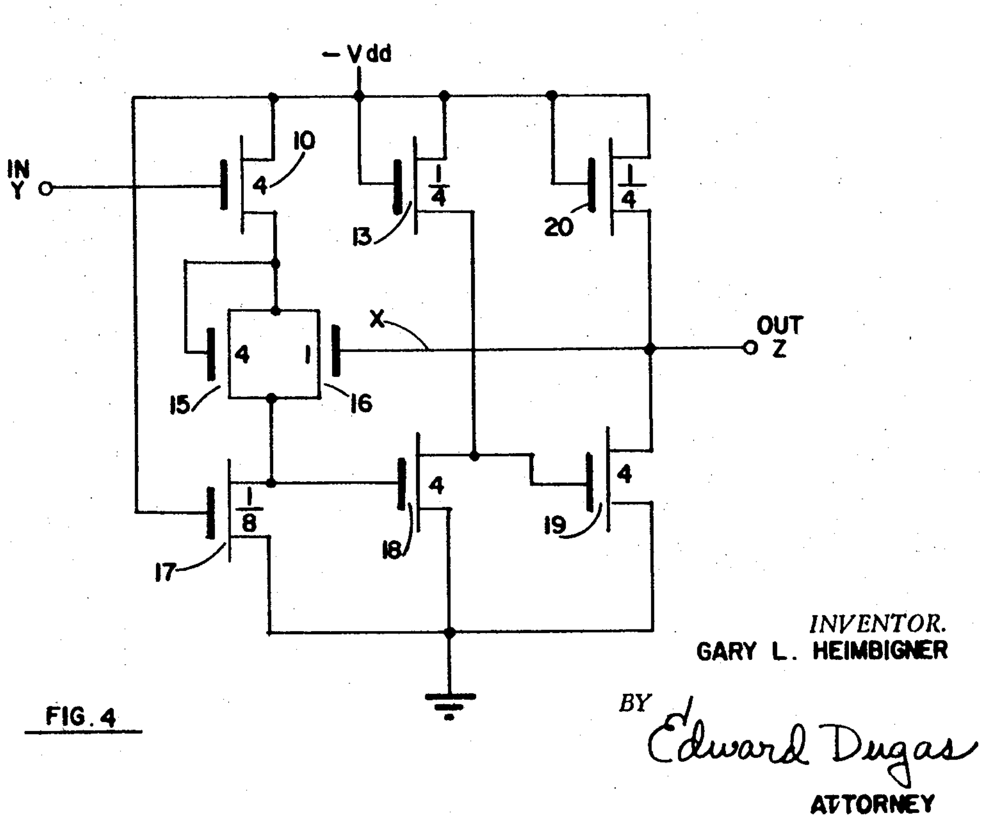
FIG. 4 is a circuit schematic diagram of a third embodiment of the invention.

Referring now to FIG. 4, the circuit shown in FIG. 4 provides a compromise between the threshold levels shown in FIG. 1 and the threshold levels achievable in the circuit of FIG. 3. In addition, an inverting stage consisting of transistors 20 and 19 is added to the circuit. The input terminal Y is connected to the gate of transistor 10 with the drain of transistor 10, the gate of transistor 13, the gate of transistor 17, and the gate of transistor 20, along with the drain of transistor 13, and the drain of transistor 20 all being connected to the −V supply source. The source of transistor 10 is connected to the gate and the drain of transistor 15 along with the drain of transistor 16. The sources of transistors 15 and 16 are connected to the drain of transistor 17 and the gate of transistor 18. The sources of transistors 17, 18 and 19 are connected to ground or a common reference potential. The gate of transistor 16 is connected to an output terminal Z which, in turn, is connected to the source of transistor 20 and the drain of transistor 19. The source of transistor 13 is connected to the drain of transistor 18 and to the gate of transistor 19.

With zero signal on the input terminal Y, transistors 10, 15 and 18 are off, transistor 19 is on and the potential at the output of terminal Z is approximately 0 volts. As a negative going input signal is received on input terminal Y, and as the negative going signal passes the threshold turn-on levels of devices 10 plus 15 which in turn drives the gate of transistor 18 more negative, turning transistor 18 on which, in turn, drives the gate of transistor 19 more towards ground potential, therefore, turning that transistor off, bringing the output terminal Z more negative, towards –V, which simultaneously makes the gate of transistor 16 more negative, turning transistor 16 on which, in turn, increases the conductance through the parallel combination of transistors 15 and 16, thereby increasing the negative potential seen by the drain of transistor 17 and the gate of transistor 18, which, in turn, turns transistor 18 on even harder, which drives transistor 19 full off. Transistors 13 and 20 act as resistance elements or loads, due to the fact that their gates and drains are connected directly to the –V source. As the input signal on terminal Y starts positive, transistor 10 starts to turn off which, in turn, turns transistor 15 off, driving the voltage on the gate of transistor 18 more positive, which starts to turn transistor 18 off, which in turn, increases the potential on the gate of transistor 19 towards the –V potential turning transistor 19 on. The output terminal Z is thus driven positive towards ground potential which, in turn, turns transistor 16 off, to increase the resistance between the source and drain of transistor 16, which drives the potential on the gate of transistor 18 even more positive, turning transistor 18 full off which, in turn, turns transistor 19 full on, applying substantially ground potential to the output terminal Z and to the gate of transistor 16.

Figure 5:
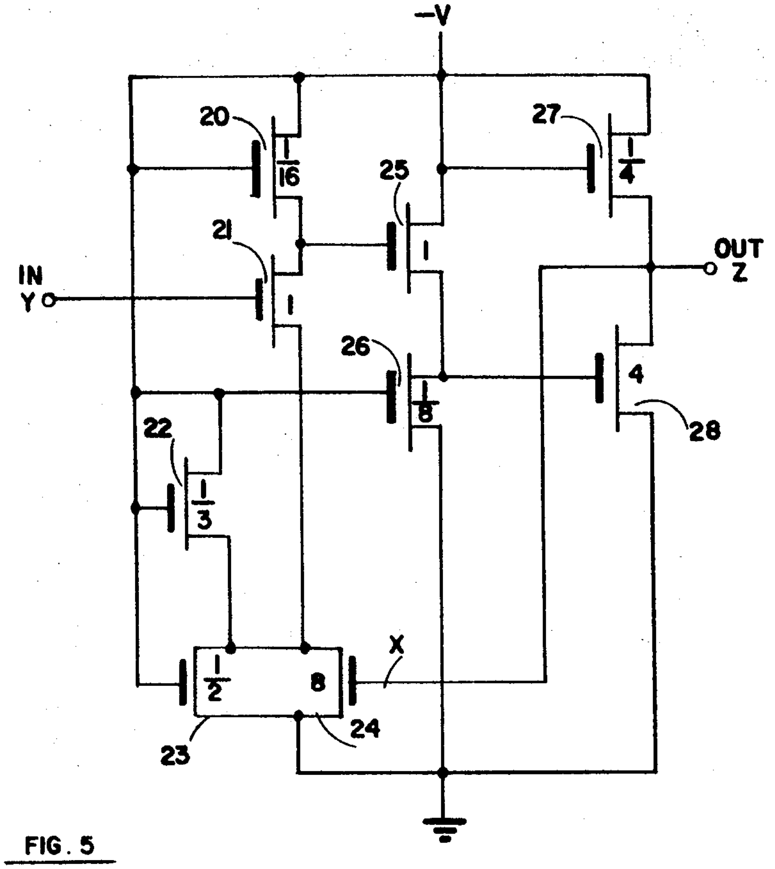
FIG. 5 is a circuit schematic diagram of a fourth embodiment of the invention.
Figures 6A, 6B:
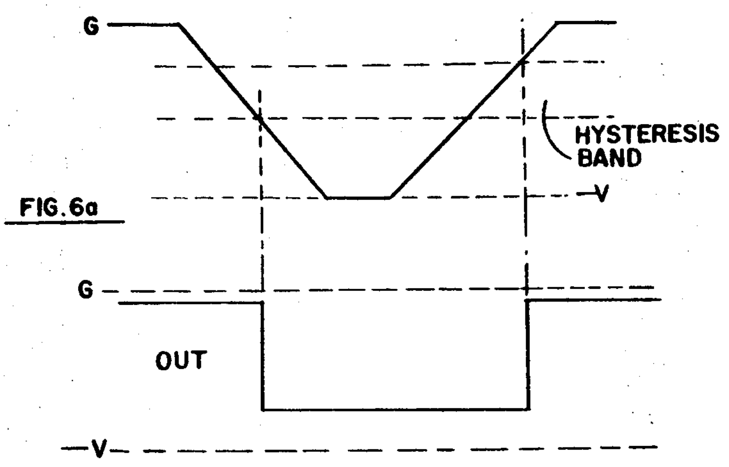
FIG. 6*a* and 6*b* illustrate waveforms useful in understanding the operation of the fourth embodiment of the invention.

Refer now to FIG. 5 and FIGS. 6*a* and 6*b*, wherein is shown a circuit and waveforms respectively for positioning the hysteresis band less than two threshold drops away from ground. In this circuit, the drains of transistors 20, 22, 25, 27 and the gates of transistors 20, 22, 26, 23 and 27 are all connected to the –V source. The input terminal Y is connected to the gate of transistor 21. The source of transistor 20 is connected to the drain of transistor 21 and to the gate of transistor 25. The source of transistor 21 is connected to the drain of transistors 23, 24 and to the source of transistor 22. The sources of transistors 23, 24, 26 and 28 are connected to ground or other reference potential. The source of transistor 25 is connected to the drain of transistor 26 and to the gate of transistor 28. The source of transistor 27 is connected to the drain of transistor 28 and to the output terminal Z and also to the gate of transistor 24. Transistors 22 and 23 form a voltage divider which is always on. For the case where –V potential supply is approximately –25 volts and the input is going negative to –15 volts, transistor 21 begins to turn on and is conducting assuming that the source of transistor 21 is set to a potential of approximately 10 volts by the divider action of transistors 22 and 23; the gate of transistor 25 is thereby driven to approximately –11 volts. Transistors 25 and 26 then act as a level detector. The gate of transistor 28 is more positive than the gate of transistor 25 by approximately 7 volts, the equivalent of one device drop. The gate of transistor 28 would then move more positive, that is, towards the ground potential, shutting off transistor 28, causing the output of terminal Z to go negative to the –V potential. This would cause transistor 24 to turn on. The drain of transistor 24 would then go positive, turning transistor 21 on harder. In turn, this would cause the gate of transistor 25 and the gate of transistor 28 to go more positive, turning both of these transistors off harder which, in turn, would turn transistor 24 on even more. When the input on terminal Y goes more positive to approximately –6 volts, transistor 21 begins to turn off, causing the gate of transistor 25 and the gate of transistor 28 to go more negative which turns on transistor 28 which, in turn, causes the output at terminal Z to go positive which positive potential is felt on the gate of transistor 24, causing transistor 24 to start to turn off which, in turn, causes the source of transistor 21 to go more negative. When the source of transistor 21 goes more negative, device 21 turns off even harder. An additional modification may be made to the circuit of FIG. 5 to achieve shifting of the hysteresis band. This modification involves connecting the gate of transistor 23 to an external signal source and disconnecting the gate of transistor 23 from the –V supply. The external signal then can control the level at which gate 23 is turned off and on which, in turn, will affect the position of the hysteresis band (trigger point) at which the output at terminal Z shifts state.

Figure 7:
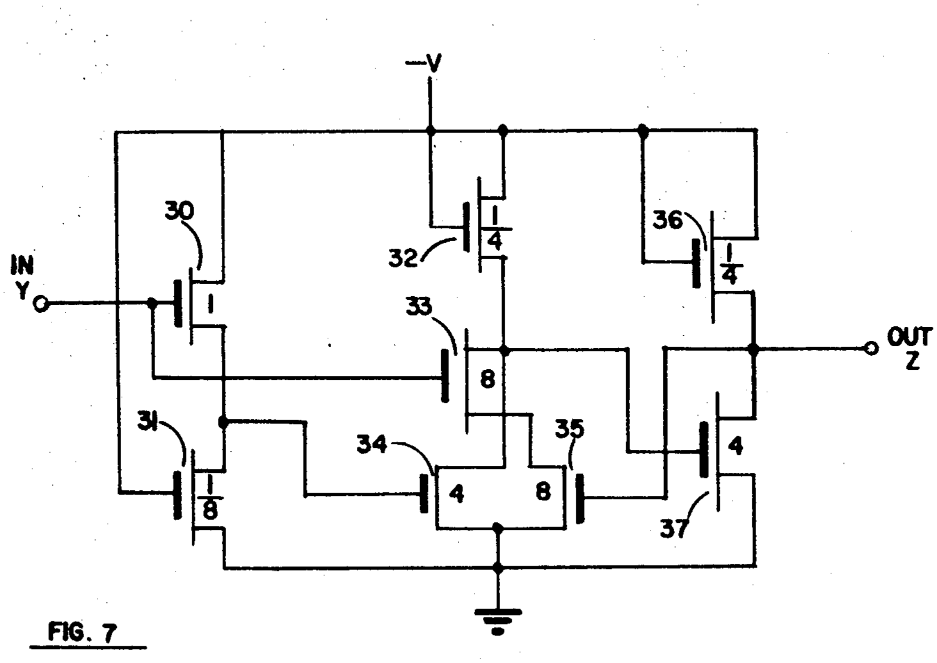
FIG. 7 is a circuit schematic diagram of a fifth embodiment of the invention.

Referring now to FIG. 7, this particular circuit is used when the triggering point is to be closer to the ground or reference potential. The trigger band is equal to one device drop and, more specifically, the trigger circuit requires two device drops to be turned on when the input signal is going negative and one device drop to be turned off when the input signal is going positive. In the circuit, the drains of transistors 30, 32, 36 and the gates of transistors 31, 32 and 36 are connected to the –V supply. The source of transistor 30 is connnected to the drain of transistor 31 and to the gate of transistor 34. The sources of transistors 31, 34, 35, and 37 are connected to a common reference potential, most commonly, ground. The source of transistor 32 is connected to the drain of transistor 33, the drain of transistor 34, and the gate of transistor 37. The source of transistor 33 is connected to the drain of transistor 35. The source of transistor 36 is connected to the drain of transistor 37 and to the output terminal Z which is connected also to the gate of transistor 35.

In operation, as the input signal on terminal Y goes negative at least two device threshold drops, transistors 30 and 33 start to turn on. As transistor 30 turns on, the gate of transistor 34 goes negative towards the –V potential tending to turn transistor 34 on, decreasing the potential towards ground at the drain of transistor 33 which tends to turn transistor 37 off which moves the potential at the output terminal Z towards the –V potential which, in turn, turns transistor 35 on thereby driving the potential at the drain of transistor 35 more positive which, along with the fact that transistor 33 is on, clamps the gate of transistor 37 to ground. As the input signal on terminal Y decreases to a potential of less than two device threshold drops, device 34 turns off so devices 33 and 35 are maintaining the logical condition of the circuit. As the input signal on terminal Y decreases to a potential of less than one device threshold drop, transistor 33 turns off, thereby turning transistor 37 on causing the output terminal Z to move towards ground potential which turns transistor 35 off.

In summary, a trigger circuit is turned on when the input signal reaches a predetermined level and is turned off at a different level by means of a positive feedback circuit which changes the trigger level of the input level detecting transistors.

I claim:

1. A transistor circuit comprising:

a. a potential source;

b. an input terminal and an output terminal;

c. a first field effect transistor, the gate thereof connected to said input terminal, the drain connected to said potential source;

d. a second field effect transistor with the gate and drain thereof connected to the source of said first transistor;

e. a third field effect transistor with the drain thereof connected to the source of said second transistor, the gate connected to said potential source, the source thereof connected to a common reference point;

f. a fourth field effect transistor, the drain thereof connected to the source of said first transistor, the source thereof connected to the drain of said third transistor;

g. a fifth transistor, the drain and gate thereof connected to said potential source;
h. a sixth field effect transistor, the drain thereof connected to the source of said fifth transistor, the gate connected to the drain of said third transistor and the source connected to a common reference point;
i. a seventh field effect transistor, the gate and drain thereof connected to said potential source, the source thereof connected to said output terminal and to the gate of said fourth transistor; and
j. an eighth field effect transistor, the drain of which is connected to said output terminal, the gate connected to the drain of said sixth transistor and the source connected to a common reference point. 10

2. A transistor circuit comprising:
a. a potential source;
b. an input terminal and an output terminal;
c. a first field effect transistor, the gate thereof connected to said input terminal and the drain connected to said potential source;
d. a second field effect transistor with the gate and drain thereof connected to the source of said first transistor;
e. a third field effect transistor, the gate thereof connected to said potential source, the drain connected to the source of said second transistor and the source connected to a common reference point;
f. a fourth field effect transistor with the drain thereof connected to the source of said second transistor, the source connected to a common reference point;
g. a fifth field effect transistor with the gate and drain thereof connected to said potential source, and the source connected to said output terminal and to the gate of said fourth transistor; and
h. a sixth field effect transistor, the gate thereof connected to the source of said second transistor, the drain connected to said output terminal and the source connected to a common reference point.

3. A transistor circuit comprising:
a. a potential source;
b. an input terminal and an output terminal,
c. a first field effect transistor, the gate thereof connected to said input terminal;
d. a second field effect transistor, the gate and drain thereof connected to said potential source, the source thereof connected to the drain of said first transistor
e. a third field effect transistor, the gate and drain thereof connected to said potential source;
f. a fourth field effect transistor, the gate thereof connected to said potential source, the drain connected to the source of said third transistor and the source thereof connected to a common reference point;
g. a fifth field effect transistor, the drain thereof connected to the source of said first transistor and the source of said third transistor, the source thereof connected to a common reference point;
h. a sixth field effect transistor, the gate thereof connected to the source of said second transistor, the drain connected to said potential source;
i. a seventh field effect transistor, the drain thereof connected to the source of said sixth transistor, the gate electrode connected to the drain of said third transistor, and the source thereof connected to a common reference point;
j. an eighth transistor, the drain and gate thereof connected to said potential source, the source connected to said output terminal and to the gate of said fifth transistor; and
k. a ninth field effect transistor, the drain thereof connected to said output terminal, the gate connected to the drain of said seventh transistor and the source of said sixth transistor and the source connected to said common reference point.

4. A transistor circuit comprising:
a. a potential source;
b. an input terminal and an output terminal;
c. a first field effect transistor, the gate thereof connected to said input terminal, the drain connected to said potential source;
d. a second field effect transistor with the gate thereof connected to said potential source, the source connected to the source of said first transistor and the source connected to a common reference point.
e. a third field effect transistor, the drain and gate thereof connected to said potential source;
f. a fourth field effect transistor, the gate thereof connected to said input terminal, the drain connected to the source of said third transistor;
g. a fifth field effect transistor, the gate thereof connected to the drain of said second transistor, the draln connected to the drain of said fourth transistor and the source connected to a common reference point;
h. a sixth field effect transistor, the drain thereof connected to the source of said fourth transistor and the source connected to a common reference point;
i. a seventh field effect transistor, the gate and drain thereof connected to said potential source, the source connected to said output terminal and to the gate of said sixth transistor; and
j. an eighth field effect transistor, the gate thereof connected to the drain of said fourth transistor, the drain connected to said output terminal, and the source connected to a common reference point 5. A digital circuit for generating a first output voltage level in response to a first voltage level of an input pulse and a second output voltage level in response to a later occurring and lesser second voltage level of the input pulse, said first and second voltage levels of said input being between the extreme voltage levels of said input pulse, said circuit comprising,
first detector means responsive to the voltage levels of said input pulse for generating a control voltage as a function of the first and second voltage levels of said input pulse,
second means responsive to said control voltage for generating said output voltage levels,
third means receiving a feedback from the output control,
said first and third means including switchable impedance means being connected in electrical parallel with each other for generating said control voltage as a function of the parallel impedance of said first and third means, said impedance being at least partially controlled by said feedback.

6 .The digital circuit recited in claim 5 wherein said first detector means comprises first and second field effect transistors connected in series, said control voltage being generated at a point between said series connected field effect transistors, said first field effect transistor receiving said input pulse, and
said third means comprising a third field effect transistor connected in electrical parallel with said second field effect transistor, said third field effect transistor having a gate electrode connected to said output for receiving said feedback, said feedback switching the impedance of the parallel combination of said second and third field effect transistors for controlling the control voltage level at the point between said first and second field effect transistors.

7. The digital circuit recited in claim 5 wherein said fist detector means comprises first and second field effect transistors connected in electrical parallel and having a common connection for providing said control voltage to said second means, and
said third means comprising a third field effect transistor connected in electrical series with said first field effect transistor and having a gate electrode connected to receive the feedback from said output for switching the impedance of said first and third field effect transistors connected in electrical parallel with said second controlling field effect transistor control voltage level at said common connection.

8. The digital circuit recited in claim 7 wherein said first detector means further comprises a fourth field effect transistor connected between the input and the gate electrode of said second field effect transistor for determining the first voltage level of the input pulse at which said digital circuit responds, said first field effect transistor having its gate electrode connected to said input for determining the second voltage level of the input pulse at which said digital circuit responds, and said second means comprising a fifth field effect transistor having its gate electrode connected to said common point for receiving said control voltage.

PO-1050
(5/69)

UNITED STATES PATENT OFFICE
CERTIFICATE OF CORRECTION

Patent No. 3,612,908 Dated October 12, 1971

Inventor(s) Gary L. Heimbigner

It is certified that error appears in the above-identified patent and that said Letters Patent are hereby corrected as shown below:

Claim 4, Column 6, line 5, change "source" (second occurrence) to "drain".

Signed and sealed this 28th day of March 1972.

(SEAL)
Attest:

EDWARD M.FLETCHER,JR.
Attesting Officer

ROBERT GOTTSCHALK
Commissioner of Patents